Patented Dec. 19, 1950

2,534,703

UNITED STATES PATENT OFFICE 2,534,703

DRY RESINATE COMPOSITION

Earl Stanley Fenelon, Jr., Elroy, Wis., and Edwin C. Howard, Wilmington, Del., assignors to Hercules Powder Company, Wilmington, Del., a corporation of Delaware No Drawing. Application October 18, 1947, Serial No. 780,756

8 Claims. (Cl. 260—27)

This invention relates in general to a dry resinate and in particular to a dry resinate containing a petroleum resin and to the method of its preparation.

In the preparation of dry resinates which are useful, for example, as paper sizing agents, adhesives, binders and the like, a substantially neutral rosin dispersion or solution is prepared and dried, for example, by spray drying or the like. Attempts have been made to modify these dry resinates by the inclusion therein of various materials such as, for example, waxes and the like, to provide resinates having special properties and characteristics. It has been recognized that it would be desirable to use, as a rosin modifier, various of the nonsaponifiable petroleum products; however, prior to the present invention it has been believed impossible to incorporate into dry resinates petroleum modifiers other than the paraffin waxes. For example, a heavy asphalt generally is compatible with rosin, but when an asphalt-modified rosin is saponified with aqueous alkali, the asphalt quickly separates out in stringy particles which render the product unusable.

Now in accordance with the present invention, there is prepared a dry resinate containing a petroleum resin and characterized by being readily dispersible in water to yield a dispersion substantially free from agglomerated petroleum material. The dry resinate is dispersible by mixing with water under the conditions usually encountered in the use of dry rosin products.

In carrying out this invention, there is prepared an aqeous dispersion of a petroleum resin obtained, for example, by solvent treatment of petroleum distillation products and containing less than about 5% asphaltenes, dispersed with a substantially completely saponified rosin, and the thus prepared aqueous dispersion is then spray dried to yield a fine powder possessing the advantageous characteristics hereinbefore described. The petroleum resin in the spray-dried product comprises up to about one-half to two-thirds of the total solids of the material.

The following examples are presented in further illustration of preferred embodiments of this invention and it is to be understood that these examples are illustrative and must not be considered in limitation of the scope of the invention.

Example 1

A dry resinate was prepared from the following resinous materials: a petroleum resin manufactured by the Socony-Vacuum Oil Company and marketed under the name "Asphalt Compounding Material (Type C Soft Resin)" and an FF grade wood rosin. Four hundred twenty parts of the wood resin and 180 parts of the petroleum resin were melted together in an autoclave and heated to a temperature of 182° C. At this point, 103.2 parts of a 47% caustic solution was injected into the autoclave under pressure and the autoclave pressure then increased to 75 lb./sq. in. gage pressure. One hundred thirty-four parts of water was then injected in a similar manner, and the gage pressure subsequently increased to 150 lb./sq. in. The mixture was maintained and mixed for 20 minutes at 150 lb./sq. in. pressure and the contents of the autoclave released through a spray nozzle into a drying chamber through which drying air at 135° C. was being passed. The dried product was collected at the bottom of the chamber after falling countercurrently through the stream of drying air. The product was light tan in color and readily dispersible in water by simple mixing and mild stirring, to form a dispersion in which most of the dispersed particles had a diameter of less than 0.5 micron and none of which exceeded 5.0 microns in diameter.

Example 2

A dry resinate was prepared using an FF grade wood rosin and a petroleum resin composition marketed by the Standard Oil Company of Indiana under the name "Stanolite 170." Four hundred twenty parts of the wood rosin and 180 parts of the petroleum resin were melted and mixed in an autoclave. After the materials were completely melted and mixed, 106.2 parts of a 47% caustic solution was injected into the autoclave and the gage pressure increased to 65 lb./sq. in. and the mixture mildly agitated for ten minutes. Then, 130.8 parts of water was introduced into the autoclave and the temperature of the mixture adjusted to 182° C. After remaining at this temperature for 20 minutes, the mixture was released through a spray nozzle and a drying chamber through which was passed drying air at an inlet temperature of 150° C. The dried mixture was collected at the bottom of the chamber.

A sulfite paper pulp was beaten to a freeness of 750 cc. (S.-R.) and the dry petroleum resin-modified resinate was added directly to the beater engine in the amount of 3% (based on the weight of pulp). The resinate was readily dispersed and became thoroughly mixed with the fibrous furnish. Papermaker's alum was added to bring the pH to 4.6 and the furnish was then sheeted according to standard papermaking procedures. The sized paper was characterized by being completely free from observable sizing spots.

*Example 3*

A dry resinate was prepared from an FF grade wood rosin and a petroleum resin supplied by the Standard Oil Company of New Jersey under the name "Propane Precipitated Asphalt." Three hundred sixty parts of the wood rosin and 240 parts of the petroleum resin were melted and mixed together in an autoclave. Ninety-four parts of a 47% caustic solution was then injected and allowed to react for ten minutes after which 139 parts of water was injected into the mixture and agitated for an additional ten minutes. At this point, the temperature was 191° C. and the gage pressure 185 lb./sq. in. The mixture was then released through a spray nozzle and dried in a drying chamber through which air was passed at an inlet temperature of 135° C. The dry product was collected at the bottom of the chamber and had less than 0.5% free rosin based on the total weight of solids. The product was characterized by being readily dispersible when added directly to a paper beater, resulting in a sized paper free from sizing spots.

The dry resinate of the present invention is prepared by substantially completely saponifying the rosin component of the rosin-petroleum resin dispersion with an aqueous alkali-metal alkali, carbonate, or the like, followed by drying of the resulting saponified product according to any of the several processes known in the art. Desired quantities of rosin and petroleum resin are heated in an autoclave under pressure to a temperature of about 120° to about 200° C. with an alkaline saponifying agent such as, for example, sodium hydroxide, sodium carbonate, potassium hydroxide, potassium carbonate or the like in an aqueous medium. The quantity of the alkaline material should be just sufficient for substantially complete saponification of the rosin so that the resinate product is substantially neutral, i. e., contains not more than about 5% of the total rosin in the form of free rosin and contains not more than about 0.2% of free alkali. Antioxidants and other modifying agents such as, for example, small quantities of waxes or the like may conveniently be added to the composition at this stage of the manufacture.

Heating of the mixture of rosin, petroleum resin and aqueous alkali is continued until the reaction is complete, after which the mixture is discharged, for example, under its own pressure through a spray nozzle into a drying chamber maintained substantially at atmospheric pressure and at such conditions of temperature and humidity to dry the product quickly to a fine dry powder. The drying conditions may vary, but, when as is usually the case, the mixture to be dried contains about 15 to about 35% water, the drying air will be maintained at a temperature between about 65° and about 150° C. and at a relative humidity less than about 80%. The drying conditions may conveniently be maintained by continuously circulating hot air through the chamber, preferably in a direction countercurrent to the discharge of the mixture through the spraying nozzle.

In selecting the rosin for the composition according to this invention, there may be used the various grades of wood or gum rosin as desired such as, for example, an FF wood rosin or one of the paler or darker grades of rosin and rosinlike materials. Thus, there may be used rosin itself, hydrogenated rosin, polymerized rosin, heat-treated rosin, partially decarboxylated rosin, or the like, either alone or two or more of these materials in combination. Likewise, there may be used portions of various darker grades of rosin and rosinlike materials such as, for example, dark-colored materials, rosinlike in film-forming properties and separated as by-products during the purification of a wood or gum rosin and characterized by being partially or substantially gasoline-insoluble. Highly satisfactory results are obtained by using a mixture of two or more rosin and rosinlike materials such as, for example, a mixture of an ordinary wood or gum rosin together with a partially or substantially gasoline-insoluble dark-colored rosin by-product material.

Various rosin modifiers such as plasticizers and other rosin compatible nonrosin materials and compositions may be added to the composition itself or to the rosin prior to its compounding to an extent conforming with its compatibility with the rosin in order to improve or modify the physical or chemical properties of the rosin component or the dry resinate composition. For example, small amounts of plasticizers and the like as well as other additives such as oxidation inhibitors or the like may be included in the composition to improve the properties thereof.

The term "rosin" as used in the specification and claims will be understood to include materials such as wood or gum rosin and also rosinlike materials and modified rosins which are characterized by being saponifiable to form materials similar to ordinary resinates.

The petroleum resin used in this composition is a light-colored resinous material which may be separated by solvent treatment of petroleum products; "Industrial and Engineering Chemistry," pages 294–298, March 1940, describes methods of obtaining resins of this type from petroleum residues. For example, a petroleum distillation residue or heavy distillation fraction may be treated by the addition of a solvent such as propane whereby substantial quantities of the asphaltenes and the like are separated out, and upon further addition of propane a resin of the type contemplated by this invention will separate. These resins generally have characteristics between the paraffins and asphaltenes in such properties as solubilities, color, and the like and may contain small proportions of asphaltlike materials, i. e., up to about 5% asphaltenes. They are generally semisolid and balsamlike at room temperature and fluid slightly above room temperature and have boiling or distillation points in the range of the usual petroleum lubricating oil or distillation residue components. They are substantially chemically neutral, i. e., nonacidic, and are readily compatible with rosin. A particular resin which has proved highly satisfactory for the composition and process described herein is sold by the Socony-Vacuum Oil Company under the name "Asphalt Compounding Material (Type C. Soft Resin)" and other similar resins of this class and type are also highly satisfactory, e. g., a product supplied under the name "Kendex 0860," by Kendall Refining Company, and having a specific gravity (26.7/20) of 0.9867, a flash point (C. O. C. °F.) 463, a solubility in petroleum ether 99.9%, a color (Lovibond equivalents) 30 yellow, 1 red, and an acid number of nil; "Dutrex B," by Shell Oil Company, having a specific gravity of 1.0085, a flash point of 498° F., solubility in petroleum ether of 99.6, a color of 50 yellow and 7 red, and an acid number of nil; "Asphalt Compound Material (Petroleum Resin Type A Soft)," by Socony-Vacuum Oil Company, having a specific gravity of 0.9535, a flash point of 422° F., a solubility in petroleum ether of 98.5%, a color of 50 yellow and 5.5 red, and an acid number of nil; and "Depropanized Resin 44–EL–298," by Esso Laboratories Standard Oil Company of Louisiana, having a specific gravity of 0.9186, a flash point of 533° F., a solubility in petroleum ether of 98.5%, a color of 8 yellow and 2 red, an acid number of 1.2, and a viscosity (S. F. at 140° F.) of 116, as well as "Propane Precipitated Asphalt," by the Standard Oil Company of New Jersey and having a specific gravity of 0.9989, a flash point of 530° F., a solubility in petroleum ether of 98.0%, a color of 50 yellow and 155 red, and an acid number of 1.2 The materials which are substantially completely free from asphaletenes, such as, for example, "Asphalt Compounding Material (Type C Soft Resin)" are characterized by generally yielding dry resinates which are readily dispersible in water by simple mixing, even without any agitation whatsoever. The materials containing small amounts of asphaltenes, but less than about 5% asphaltenes, are generally characterized by being readily dispersible in water upon agitation.

The petroleum resin is highly compatible with rosin both when melted and mixed and when added to an aqueous dispersion containing free or saponified rosin; up to as much as one-half to two-thirds of the total solids of the composition may consist of the petroleum resin constituent. When the resin-petroleum resin mixture is saponified prior to drying, there is obtained an aqueous dispersion characterized by containing no large agglomerated particles, whereby it is possible to dry the material to form a dry material in which the petroleum resin is present in uniform, small particles. A dispersion prepared from the heavy asphalts, on the other hand, contains large asphaltic agglomerates, thereby limiting the effective materials to those petroleum resins characterized by containing less than about 5% asphaltenes and being compatible with a dispersion of saponified rosin. The inclusion of the petroleum resin does not alter the stability characteristics of the resinate; the petroleum resin modified resinate may be prepared, stored, tranported and used with the same techniques and equipment conventionally employed with unmodified resinates.

What we claim and desire to protect by Letters Patent is:

1. A dry resinate composition comprising dry, saponified rosin and a petroleum resin containing less than 5% asphaltenes, the composition being characterized by being dispersible in water to form a dispersion free from asphaltic agglomerates, the petroleum resin comprising up to two-thirds of the total solids of the composition, said petroleum resin being isolated from petroleum distillation residues and being the resin which is obtained therefrom through the addition of propane in an amount to precipitate the asphalt content of the petroleum distillation residue and subsequent addition, to the substantially asphalt-free petroleum residue, of a further quantity of propane to precipitate the petroleum resin therefrom.

2. A dry resin composition comprising dry, saponified rosin and a petroleum resin containing less than 5% asphaltenes, the composition being characterized by being dispersible in water to form a dispersion free from asphaltic agglomerates, the petroleum resin comprising between about 20 and about 50% of the total solids of the composition, said petroleum resin being isolated from petroleum distillation residues and being the resin which is obtained therefrom through the addition of propane in an amount to precipitate the asphalt content of the petroleum distillation residue and subsequent addition, to the substantially asphalt-free petroleum residue, of a further quantity of propane to precipitate the petroleum resin therefrom.

3. A dry resinate composition comprising dry, saponified rosin and a petroleum resin containing less than 5% asphaltenes, the composition being characterized by being dispersible in water to form a dispersion free from asphaltic agglomerates, the petroleum resin comprising between about 30 and about 35% of the total solids of the composition, said petroleum resin being isolated from petroleum distillation residues and being the resin which is obtained therefrom through the addition of propane in an amount to precipitate the asphalt content of the petroleum distillation residue and subsequent addition, to the substantially asphalt-free petroleum residue, of a further quantity of propane to precipitate the petroleum resin therefrom.

4. A dry resinate composition comprising dry, saponified rosin and a petroleum resin substantially free from asphaltenes, the dry composition being characterized by being dispersible in water to form a dispersion having substantially no particles larger than 20 microns in diameter, said petroleum resin comprising up to two-thirds of the total solids of the composition, said petroleum resin being isolated from petroleum distillation residues and being the resin which is obtained therefrom through the addition of propane in an amount to precipitate the asphalt content of the petroleum distillation residue and subsequent addition, to the substantially asphalt-free petroleum residue, of a further quantity of propane to precipitate the petroleum resin therefrom.

5. A process for preparing a dry resinate composition comprising preparing an aqueous dispersion of a saponified rosin and a petroleum resin containing less than 5% asphaltenes, the dispersion being characterized by being free from asphaltic agglomerates, the petroleum resin comprising up to two-thirds of the total solids of the dispersion, and drying the aqueous dispersion to yield a dry material dispersible in water, said petroleum resin being isolated from petroleum distillation residues and being the resin which is obtained therefrom through the addition of propane in an amount to precipitate the asphalt content of the petroleum distillation residue and subsequent addition, to the substantially asphalt-free petroleum residue, of a further quantity of propane to precipitate the petroleum resin therefrom.

6. A process for preparing a dry resinate composition comprising preparing an aqueous dispersion of a saponified rosin and a petroleum resin containing less than 5% asphaltenes, the dispersion being characterized by being free from asphaltic agglomerates, the petroleum resin comprising between about 20 and about 50% of total solids of the dispersion, and drying the aqueous dispersion to yield a dry material dispersible in water, said petroleum resin being isolated from petroleum distillation residues and being the resin which is obtained therefrom through the addition of propane in an amount to precipitate the asphalt content of the petroleum distillation residue and subsequent addition, to the substantially asphalt-free petroleum residue, of a further quantity of propane to precipitate the petroleum resin therefrom.

7. A process for preparing a dry resinate composition comprising preparing an aqueous dispersion of a saponified rosin and a petroleum resin containing less than 5% asphaltenes, the dispersion being characterized by being free from asphaltic agglomerates, the petroleum resin comprising between about 30 and about 35% of the total solids of the dispersion, and drying the aqueous dispersion to yield a dry material dispersible in water, said petroleum resin being isolated from petroleum distillation residues and being the resin which is obtained therefrom through the addition of propane in an amount to precipitate the asphalt content of the petroleum distillation residue and subsequent addition, to the substantially asphalt-free petroleum residue, of a further quantity of propane to precipitate the petroleum resin therefrom.

8. A process for preparing a dry resinate composition comprising preparing an aqueous dispersion of a saponified rosin and a petroleum resin substantially free from asphaltenes, said dispersion being characterized by having substantially no particles larger than 20 microns in diameter, and drying the aqueous dispersion to yield a dry material readily redispersible in water, said petroleum resin comprising up to two-thirds of the total solids of the composition, said petroleum resin being isolated from petroleum distillation residues and being the resin which is obtained therefrom through the addition of propane in an amount to precipitate the asphalt content of the petroleum distillation residue and subsequent addition, to the substantially asphalt-free petroleum residue, of a further quantity of propane to precipitate the petroleum resin therefrom.

EARL STANLEY FENELON, Jr.
EDWIN C. HOWARD.

REFERENCES CITED

The following references are of record in the file of this patent:

UNITED STATES PATENTS

| Number | Name | Date |
|---|---|---|
| 2,223,086 | Williams et al. | Nov. 26, 1940 |